US012286949B2

(12) United States Patent
Gueret et al.

(10) Patent No.: US 12,286,949 B2
(45) Date of Patent: Apr. 29, 2025

(54) FUEL PUMP WITH INTEGRATED PRESSURE RELIEF VALVE

(71) Applicant: DELPHI TECHNOLOGIES IP LIMITED, St. Michael (BB)

(72) Inventors: Thibaud Gueret, Blois (FR); Vincent Laurent, Saint-Sulpice-de-Pommeray (FR)

(73) Assignee: PHINIA DELPHI LUXEMBOURG, Belvaux (LU)

( * ) Notice: Subject to any disclaimer, the term of this patent is extended or adjusted under 35 U.S.C. 154(b) by 0 days.

(21) Appl. No.: 18/576,963

(22) PCT Filed: Jul. 6, 2022

(86) PCT No.: PCT/EP2022/068761
§ 371 (c)(1),
(2) Date: Jan. 5, 2024

(87) PCT Pub. No.: WO2023/280929
PCT Pub. Date: Jan. 12, 2023

(65) Prior Publication Data

US 2025/0043759 A1 Feb. 6, 2025

(30) Foreign Application Priority Data

Jul. 6, 2021 (GB) ..................................... 2109738

(51) Int. Cl.
*F02M 59/46* (2006.01)
*F02M 59/02* (2006.01)

(52) U.S. Cl.
CPC .......... *F02M 59/46* (2013.01); *F02M 59/025* (2013.01)

(58) Field of Classification Search
CPC .... F02M 59/46; F02M 59/025; F02M 63/005; F02M 63/023
See application file for complete search history.

(56) References Cited

U.S. PATENT DOCUMENTS 7,677,872 B2 * 3/2010 Beardmore .......... F02M 59/462 417/521
10,907,600 B1 2/2021 Uckermark
(Continued)

FOREIGN PATENT DOCUMENTS

DE 102017203399 A1 9/2018
DE 102017207983 A1 11/2018
(Continued)

OTHER PUBLICATIONS

International Search Report for PCT/EP2022/068761 dated Oct. 20, 2022, 4 pages.
(Continued)

*Primary Examiner* — Grant Moubry
(74) *Attorney, Agent, or Firm* — WARNER NORCROSS + JUDD LLP

(57) ABSTRACT

A fuel pump comprises a housing with a pumping chamber, an outlet passage and a pumping plunger which is reciprocally arranged within a plunger bore. A pressure relief valve assembly is arranged in a pressure relief passage and includes:

a seat member comprising a through bore extending from a first side to an opposite, second side, and an annular seat in the second side surrounding the bore, wherein the seat member is arranged in the pressure relief passage with the first side exposed to high pressure;

a needle having an elongate shaft with a needle head, which extends through bore, the needle head being proximal the seat member and having an annular seat surface adapted to cooperate with the annular seat to close the through bore in a closed position; and a spring element arranged to exert a closing force on the needle such that it is biased in closed position.

15 Claims, 2 Drawing Sheets

(56) References Cited

U.S. PATENT DOCUMENTS

| | | | | |
|---|---|---|---|---|
| 11,384,710 | B2 * | 7/2022 | Andou | F16K 37/00 |
| 2006/0185647 | A1 | 8/2006 | Rapp | |
| 2013/0306033 | A1 * | 11/2013 | Kato | F02M 63/0225<br>123/472 |
| 2019/0085807 | A1 * | 3/2019 | Han | F02M 59/46 |
| 2019/0376472 | A1 * | 12/2019 | Koshimoto | F02M 21/0245 |

FOREIGN PATENT DOCUMENTS

| | | | |
|---|---|---|---|
| EP | 3121437 | A1 | 1/2017 |
| EP | 3715619 | A1 | 9/2020 |
| GB | 2574841 | A | 12/2019 |
| WO | 2005010351 | A1 | 2/2005 |
| WO | 2019121224 | A1 | 6/2019 |

OTHER PUBLICATIONS

Machine assisted English translation of DE102017203399A1 obtained from https://worldwide.espacenet.com/patent on Dec. 28, 2023, 13 pages.

Machine assisted English translation of DE102017207983A1 obtained from https://worldwide.espacenet.com/patent on Dec. 28, 2023, 17 pages.

* cited by examiner

FUEL PUMP WITH INTEGRATED PRESSURE RELIEF VALVE

CROSS-REFERENCE TO RELATED APPLICATIONS

This application is the U.S. National Stage of International Application No. PCT/EP2022/068761 filed on 6 Jul. 2022, which claims priority to and all advantages of United Kingdom Application No. 2109738.1 filed on 6 Jul. 2021, the contents of which are incorporated herein by reference.

FIELD OF THE INVENTION

The present invention generally relates to fuel injection in internal combustion engines and more specifically to a fuel pump with integrated pressure relief valve.

BACKGROUND OF THE INVENTION

Fuel systems in modern internal combustion engines fueled by gasoline, particularly for use in the automotive market, employ gasoline direct injection (GDi) where fuel injectors inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump—the GDi pump-which typically includes a pumping plunger which is reciprocated by a camshaft of the internal combustion engine. Reciprocation of the pumping plunger further pressurizes the fuel in order to be supplied to fuel injectors which inject the fuel directly into the combustion chambers of the internal combustion engine.

For safe operation, the GDi pump includes an embedded pressure relief valve assembly to avoid any overpressure that could burst the pump or any part of the high-pressure system behind the pump (Rail, pipes, injectors) as well as limiting the pressure so that the pressure never reaches the injector Maximum Opening Pressure (MOP).

U.S. Pat. No. 10,907,600 for example discloses such GDi pump with integrated pressure relief valve assembly.

Although not described in detail in U.S. Pat. No. 10,907,600, a conventional pressure relief valve assembly—referred to as prior design 1 "PD1"—includes a seat member that is press fitted into a cylindrical section of a pressure relief passage in the pump body, at the bottom of a blind bore. The seat member includes a central passage, which is sealed by a ball, pushed against the seat by a pin and a spring. The set point of the pressure relieve valve is defined by pressing on the spring with a plug. As the pressure of the pump is increasing (up to 600 bar for new generation fuel pumps), the pressure release valve dimensions tend to increase as well (especially the spring). By increasing the dimensions, the pumping dead volume is also increasing.

OBJECT OF THE INVENTION

The object of the present invention is to provide an improved pressure relief valve assembly, which is of simple design and allows minimizing pumping dead volume.

This object is achieved by a fuel pump with pressure relief valve assembly as claimed in claim 1.

SUMMARY OF THE INVENTION

The present invention relates to a fuel pump comprising:

- a fuel pump housing with a pumping chamber defined therein;
- an inlet passage in said housing, in which an inlet valve assembly is arranged and selectively allows low-pressure fuel to enter the pumping chamber;
- an outlet passage in the housing, in which an outlet valve assembly is arranged and selectively discharges high pressure fuel from the pumping chamber;
- a pumping plunger which is reciprocally arranged within a plunger bore in communication with the pumping chamber, whereby a reciprocating movement of the plunger alternatively increases and decreases a volume of the pumping chamber;
- a pressure relief passage extending from the outlet passage, downstream of the outlet valve assembly, to the pumping chamber; and
- a pressure relief valve assembly arranged in the pressure relief passage.

According to the invention, the pressure relief valve assembly includes: a seat member comprising a through bore extending from a first side to an opposite second side of the seat member, an annular seat surrounding the bore in the second side, wherein the seat member is arranged in said pressure relief passage with the first side exposed to high pressure;

- a needle having an elongate shaft with a first end comprising a needle head and an opposite second end, the needle extending through the bore and having its needle head proximal to the seat member, the needle head having an annular seat surface adapted to cooperate with the annular seat in said seat member;
- a spring element arranged to exert a closing force on the needle in order to maintain the head on the annular seat and hence close the through bore by default, the spring element resting against a stop member rigidly linked with the needle.

The present invention proposes an improved design of the pressure relief valve in such fuel pump. As will be understood, the first side of the seat member is exposed to high pressure, whereas the second side is exposed to the pressure of the pumping chamber. The needle has its head located on the second side of the seat member, the needle shaft passing through the seat bore and extending mainly away from the first side, exposed to high pressure. With this design, the most voluminous part of the pressure relief valve assembly, i.e. the needle shaft and spring, are located on the high-pressure side (in communication with outlet passage). Therefore, the seat member, and hence the valve seat, can be located proximal to the pumping chamber, hence reducing the pumping dead volume.

Compared to PD1, the present pressure relief valve assembly is designed as a pre-assembled unit, the resulting cylindrical shape of the assembly forming a kind of cartridge. Also, since the spring is preloaded by the stop member outside of the pump housing, it allows calibrating the valve before mounting into the pump housing. This strikingly differs from PD1, where the spring is loaded by the plug, and brings variability in the set pressure, and lead to defects/quality issues.

The stop member may generally be arranged proximal to the second end of the needle. In embodiments, the stop member is a ring member or disk-like member having a central bore and is fixedly mounted to the needle shaft. Advantageously, the stop member is press-fittingly mounted onto needle. The press-fit process allows adjusting the position of the stop member along the shaft of the needle, and hence calibrating/adjusting the spring force and the opening pressure. The stop member can thus also be referred to as calibration ring. Preferably, the stop member may take the form of a flanged collar, which increases the interface (contact surface) with the shaft and hence the strength of the interference fit.

In embodiments, the spring element is a compression spring surrounding the needle and bearing at one end on an annular surface of the first side of the seat member and at the other end on the stop member.

In embodiments, the pressure relief valve assembly further comprises a guide sleeve fitted over the needle and surrounded by the spring. The guide sleeve extends from the seat member along part of the length of the needle shaft towards the stop member. That is, the sleeve has a length inferior to the distance between the seat member and the stop member, to allow the needle to lift from the seat. The guide sleeve maintains the needle in axial alignment and limits/avoids buckling of the needle.

In embodiments, the length of the guide sleeve may be designed to limit the opening stroke of the needle.

Conventionally, inlet and outlet valve assemblies are designed as check valves, i.e. allowing only one-way flow.

Preferably, the seat member has a regular, circular outer peripheral shape, whereby the seat member is press-fittingly arranged into the pump fuel housing. The press-fit contact further provides a sealing contact preventing fuel flow around the seat member. The seat member is normally axisymmetrical.

In embodiments, the seat member comprises on the first side an enlarged bore section in axial continuation of the through bore, in which a first end of the guide sleeve is received, preferably press-fittingly.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
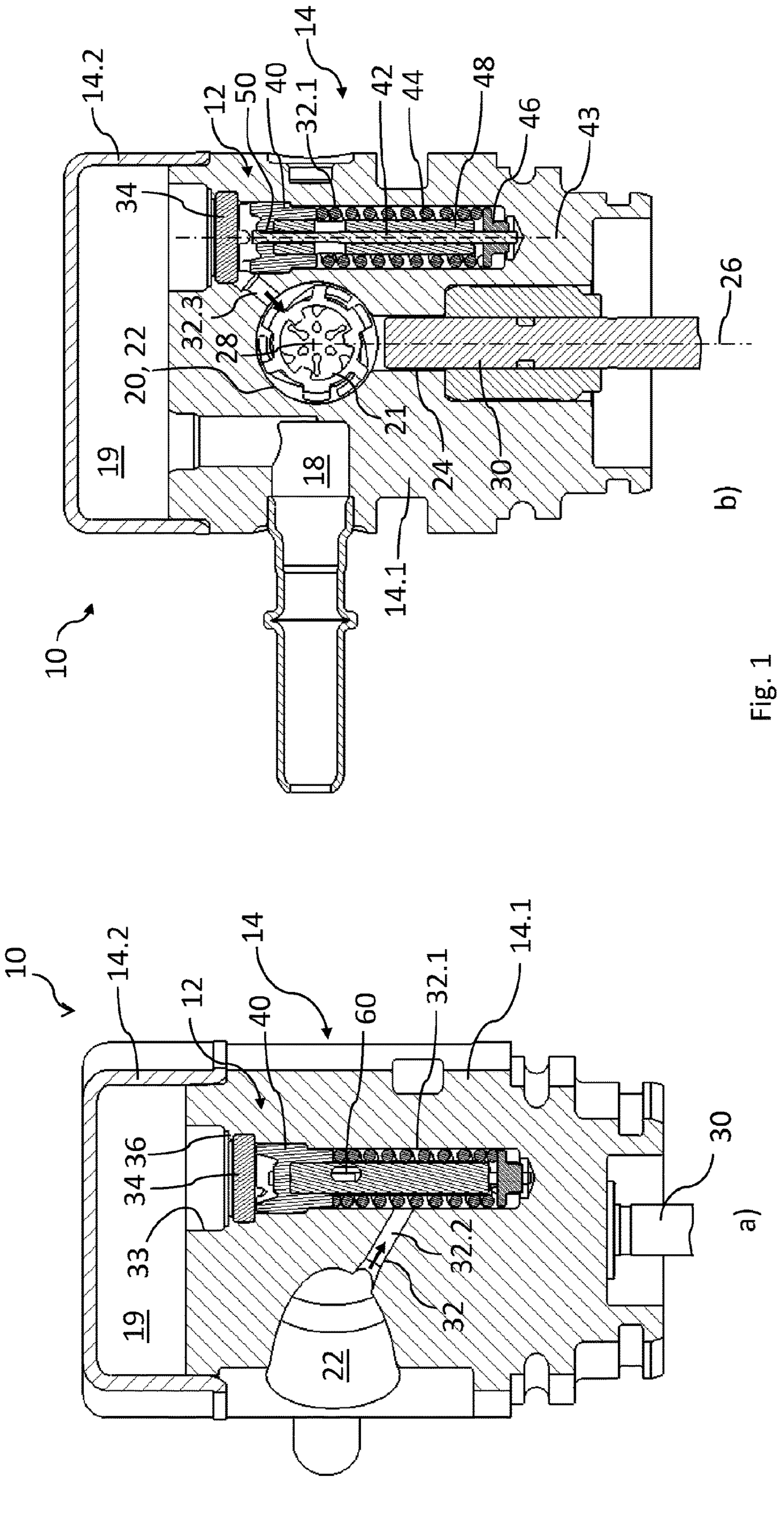
FIG. 1: a) and b) are section views, in cut planes offset by 90°, through a fuel pump with integrated pressure relief valve assembly, according to an embodiment.
Figure 3:
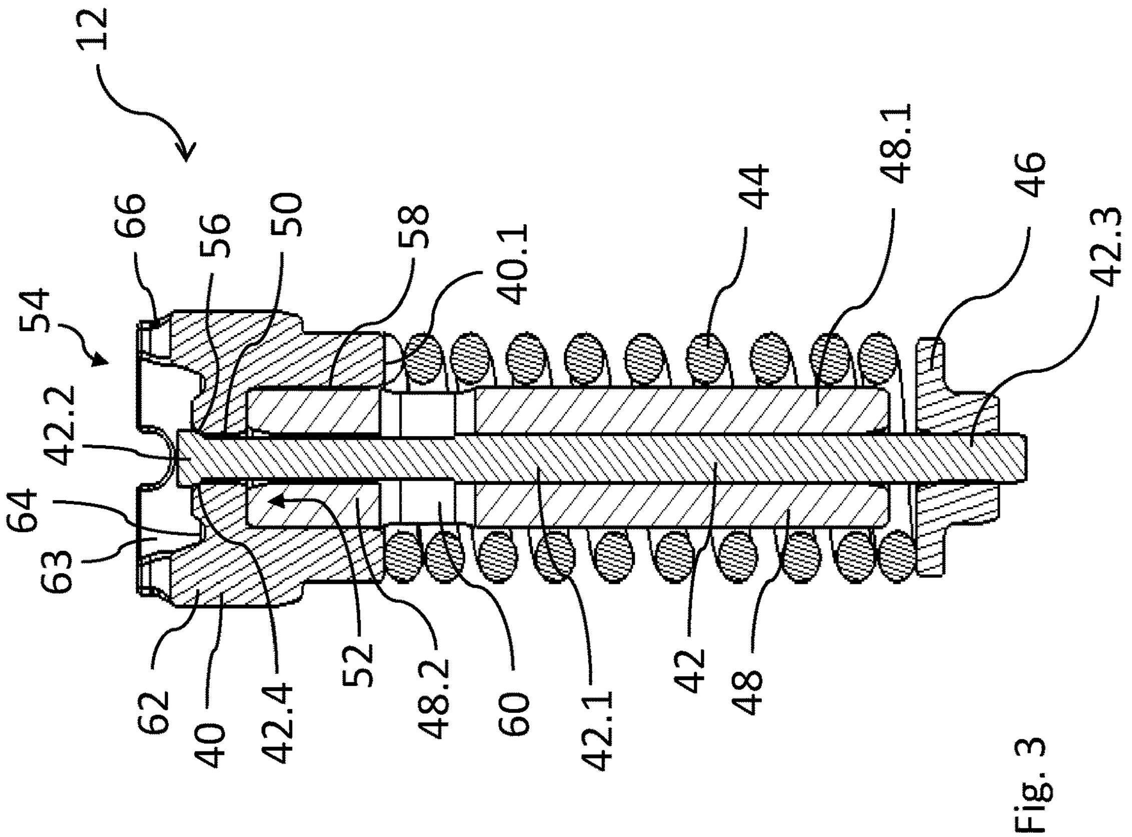
FIG. 3: is a longitudinal section view through the pressure relief valve assembly of FIG. 2.

Referring to FIG. 1, a fuel pump 10 is shown, which integrates an embodiment of the present pressure relief valve assembly 12.

The general structure and operating principle of the fuel pump 10 is generally known and will only be briefly described herein, since it is not the focus of the invention. Fuel pump 10 is typically part of a fuel system (not shown) of an internal combustion engine, which generally includes a fuel tank holding a volume of fuel to be supplied to the engine for operation thereof; a plurality of fuel injectors which inject fuel directly into respective combustion chambers of the engine; a low-pressure fuel pump (typically electric pump); and fuel pump 10, which is a high-pressure fuel pump. In such system, the low-pressure fuel pump draws fuel from fuel tank and elevates the pressure of the fuel for delivery to high-pressure fuel pump 10 which in turn further elevates the pressure of the fuel for delivery to the fuel injectors. By way of non-limiting example only, the low-pressure fuel pump may elevate the pressure of the fuel to about 500 kPa or less and high-pressure fuel pump 10 may elevate the pressure of the fuel to above about 10 MPa and may be about 60 MPa depending on the operational needs of internal combustion engine.

Referring now to FIG. 1, fuel pump 10 comprises a fuel pump housing 14 (a metal body, typically stainless steel) in which a main passageway is formed, the passageway including successively an inlet passage 18, a damping volume 19, a pumping chamber 20 and an outlet passage 22. As can be seen, in this embodiment pumping chamber 20 and outlet passage 22 are aligned along central axis 28, whereas inlet passage 18 is arranged at an angle. The passageway is mainly arranged in a main metal body 14.1 of pump housing 14, whereas damping volume is defined by a damper cup 14.2 mounted to a side of body 14.1. Reference sign 24 designates a plunger bore which extends along, and is centered about, a plunger bore axis 26. The plunger bore axis 26 is transversal to a central axis 28, in particular perpendicular thereto. High-pressure fuel pump 10 also includes a pumping plunger 30, which is located within plunger bore 24 and reciprocates within plunger bore 24 along plunger bore axis 26. Typically, the plunger 30 is actuated, via the open end of plunger bore 24, based on input from a rotating camshaft (not shown) of the internal combustion engine.

An inlet valve assembly 21 is aligned with pumping chamber 20 along central axis 28 and selectively allows fuel, arriving from the low-pressure fuel pump, to enter pumping chamber 20 while an outlet valve assembly, not shown, is located within outlet passage 22 and selectively allows fuel to be discharged from pumping chamber 20, typically towards a fuel rail (not shown) to which fuel injectors are fluidly connected. Conventionally, inlet and outlet valve assemblies are designed as check valves, i.e. allowing only one-way flow.

In operation, reciprocation of pumping plunger 30 causes the volume of pumping chamber 20 to increase during an intake stroke of pumping plunger 30 (downward as oriented in FIG. 1*b*) in which a plunger return spring (not shown) causes pumping plunger to move downward, and conversely, the volume of pumping chamber 20 decreases during a compression stroke (upward as oriented in FIG. 1*b*) in which the camshaft causes pumping plunger 30 to move upward against the force of plunger return spring. In this way, fuel is drawn into pumping chamber 20 during the intake stroke, and conversely, fuel is pressurized within pumping chamber 20 by pumping plunger during the compression stroke, depending on the state of operation of inlet valve assembly 21, and discharged through outlet valve assembly under pressure to the fuel rail and fuel injectors. The pressure relief valve assembly 12 is arranged in the fuel pump housing 14 downstream of outlet valve assembly in order to provide a fluid path back to pumping chamber 20 if the pressure downstream of outlet valve assembly reaches a predetermined limit which may pose an unsafe operating condition if left unmitigated.

More precisely, fuel pump housing 10 defines a pressure relief passage 32 extending from the outlet passage 22, downstream of the outlet valve assembly, to the pumping chamber 30. The pressure relief passage 32 here comprises three sections: a cylindrical main section 32.1, in which the pressure relief valve assembly 12 is arranged, a high-pressure section 32.2 leading from the main section 32.1 to a position downstream of the outlet valve assembly in the outlet passage 22; and a return section 32.3 communicating the main section 32.1 with the pumping chamber 20.

Figure 2:
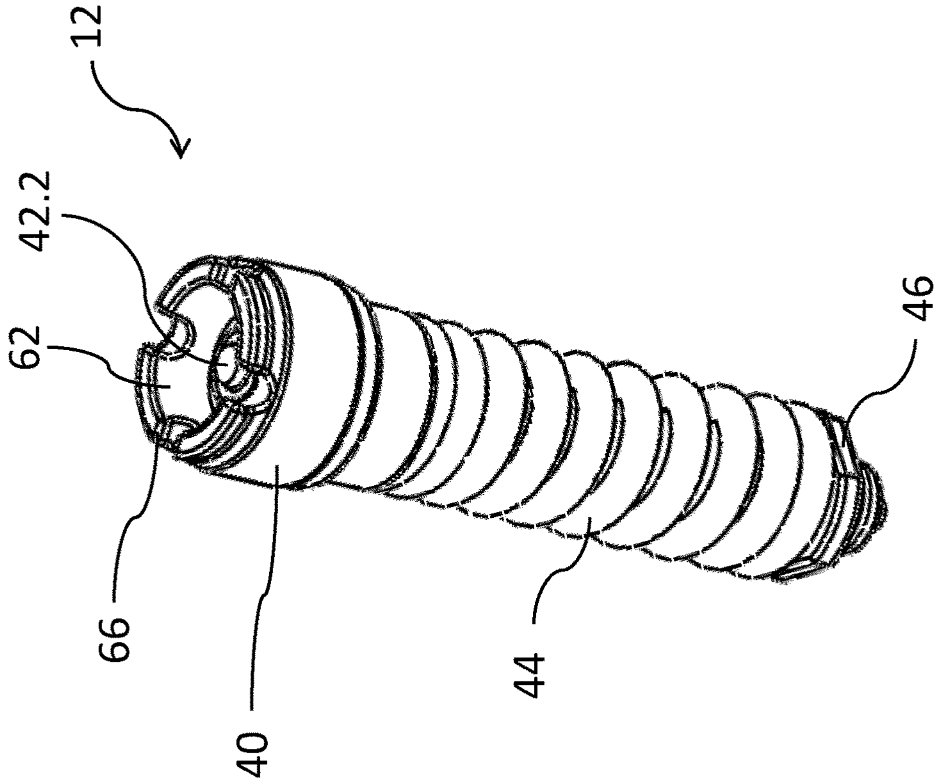
FIG. 2: is a perspective view of the pressure relief valve assembly of FIG. 1, pre-assembled before installation into the fuel pump housing.

As will be understood from FIG. 2, the pressure relief valve assembly 12 is advantageously designed as a preassembled unit (which may be referred to as "cartridge"), that can be readily installed inside the main section 32.1 of the pressure relief passage 32. The main section 32.1 partly defined by a cylindrical blind bore accessible from outside the main housing 14.1. Reference sign 34 designates a plug that closes an inlet section 33 of the blind bore, and hence sealing closes the main section 32.1 from the exterior, upon insertion of the pressure relief valve assembly 12 therein. The plug 34 may be fixed in place by any appropriate method, e.g. by press-fit, screwing and/or crimping. Reference sign 36 indicates a crimped bore section, where the bore wall has been crimped over the plug 34. It may be noted here that the pressure relief valve assembly 12 is entirely contained within the pressure relief passage 32, respectively the main section 32.1. There is no part, component or casing specific to the valve assembly 12 protruding outwardly, hence avoiding potential risks.

Referring now more specifically to the pressure relief valve assembly 12, it includes a seat member 40, a needle 42, a spring 44, a stop member 46 and preferably a guide sleeve 48. Similar to the housing 14, these components of the valve assembly 12 are typically made of stainless steel.

Seat member 40 comprises a central through bore 50 extending from a first side 52 to a second side 54 of the seat member 40. An annular seat 56 is provided in the second side 54 and surrounds the central bore 50. Preferably, the seat member 40 is axis symmetrical (relative to axis 43). The seat member 40 is here press-fittingly arranged in main section 32.1. Seat member 40 has a regular, circular outer diameter, slightly superior to that of the main section 32.1. Accordingly, the interference mounting of the seat member 40 further provides a metal to metal seal, preventing fuel flow around the seat member 40. The only flow path for fuel in the pressure relief passage 32 is through bore 50 (when open).

Needle 42 has a shaft 42.1 (extending along a longitudinal axis 43) with a first end comprising a needle head 42.2 and an opposite second end 42.3. The needle 42 extends through bore 50 and has its needle head 42.2 proximal to seat member 40. The needle head 42 has a cross-section (perpendicular to needle axis 43) larger than the needle shaft 42.1 and larger than bore 50 in the seat member 40. Needle head 42.2 has an annular sealing surface 42.4 facing annular seat 56. The latter are adapted to cooperate in order to close the fluid flow through bore 50 when needle head 42.2 rests on the seat member 40. This is the configuration shown in the figures.

Spring element 44 is arranged to exert a closing force on the needle 42, whereby the head 42.2 is applied onto the annular seat 56 and hence closes the through bore 50 by default. The spring element 44 is a compression spring bearing at one end against stop member 46 and at the opposite end against an annular surface 40.1 of seat member 40.

In the figures, the needle 42 is shown in its rest position, in which the needle head 42.2 is biased onto the annular seat 56 by the spring 44. The needle head 42.2 obturates the through bore 50 in the seat member 40 and no fluid can flow from the first side 52 towards the second side 54 of the seat member 40. The valve assembly 12 is closed. As will be understood by those skilled in the art, in case the fluid pressure reigning on first side 52 of the seat member 40 overcomes the spring pressure and the pressure on second side 54, the needle head 42.2 will raise (lift off) from its seat 56 and allow high-pressure fuel to pass through the bore 50 and hence flow back towards the pumping chamber 20. The flow of fuel trough fuel return passage 32 when valve assembly 12 is open is indicated by the arrows in FIG. 1. Conventionally, the set pressure (opening pressure) of the valve assembly 12 depends on the spring pressure and on the configuration of the needle shaft 42.1 in the region of the bore 50 and valve seat 56.

The stop member 46 is a generally annular or disk-like piece with a central hole therein, which is dimensioned to be fixed onto the needle shaft 42.1 by interference fit. Typically, the stop member 46 is press-fitted onto the shaft 42.1. The stop member 46 here is a flanged collar, which provides a longer hole and hence a longer interference surface, for a better gripping onto the needle shaft 42.1. The position of the stop member 46, which can be easily adjusted, determines the set pressure/opening pressure of the valve.

The guide sleeve 48 is fitted over the needle shaft 42.1. In the present embodiment the guide sleeve 48 is fixed at the seat member 40, being press-fittingly received in an enlarged bore section 58 in axial continuation of the through bore 50. The guide sleeve 48 is provided to maintain the needle 42 in axial alignment, in particular when the needle head 42.2 is lifted from seat 56. Therefore, a tight, sliding clearance is provided between the needle shaft 42.1 and the rear part 48.1 of the sleeve (proximal the stop member). At the front 48.2 of the guide sleeve 48, closer to the seat member 40, a greater clearance is provided between the sleeve 48 and shaft 42.1. Reference sign 60 indicates a lateral opening in the front part 48.2 of sleeve 48, which allows fuel to enter the sleeve 48 and flow towards the seat 40.

In the present embodiment, the guide sleeve 48 has a substantially constant inner diameter, and the greater clearance is provided by reducing the diameter of the needle shaft 42.1 over a section extending from the head 42.2 up to the part sliding in the rear section 48.1 of the guide sleeve 48.

It may be noted that the seat member 40 includes, on its second side, a raised, peripheral wall 62 spaced from the annular seat 56 by an annular groove 64. The peripheral wall 62 defines a recess 63, in which the needle 42 can move to open the annular seat 56. In the shown embodiment, the seat member 40 is in abutment with plug 34 and the height of the annular wall 62 defines the maximum opening stroke for the needle 42. The annular groove 64 avoids seat deformation during the press-fitting. Reference sign 66 designates a plurality of notches in the free edge of peripheral wall 62, to allow fluid flow through said peripheral wall 62, out of recess 63 (useful when the seat member is in abutment against plug 34 as is this embodiment).

The present design offers two substantial advantages. First, the cartridge design (one piece) allows pre-assembly of the pressure relief valve 12 before introduction of the valve 12 into the fuel pump housing 14, as well as calibration of the spring force, avoiding scrap at end of line testing due to valve miss adjustment. Secondly, the pumping dead volume can be significantly minimized.

Conventionally, the pumping dead volume of such pump is defined as the volume between the seat of the pressure release valve assembly, the outlet valve seat, the inlet valve and the pumping chamber when the plunger is in its top dead center position. This volume has a significant impact on the pumping efficiency, especially in the case of small pumping volume (small cam lift, small plunger diameter or both).

Compared to PD1, the present valve assembly 12 can be mounted with the seat member 40 proximal to the pumping chamber, most of the valve assembly (spring and needle) extending on the high-pressure side. The valve seat 40 can thus be arranged very close to the pumping chamber. First estimations have determined a decrease in pumping dead volume by about 70% compared to design PD1, hence improving significantly the pumping efficiency, especially with smaller plunger.

The invention claimed is:

1. A fuel pump comprising:

a housing with a pumping chamber defined therein;

an inlet passage in said housing, in which an inlet valve assembly is arranged and selectively allows low-pressure fuel to enter said pumping chamber;

an outlet passage in said housing, in which an outlet valve assembly is arranged and selectively discharges high pressure fuel;

a pumping plunger which is reciprocally arranged within a plunger bore in communication with said pumping chamber, whereby a reciprocating movement of the plunger alternatively increases and decreases a volume of said pumping chamber;

a pressure relief passage extending from said outlet passage, downstream of said outlet valve assembly, to said pumping chamber;

a pressure relief valve assembly arranged in said pressure relief passage;

wherein the pressure relief valve assembly includes:

a seat member comprising a through bore extending from a first side to an opposite, second side of said seat member, and an annular seat in said second side that surrounds said bore, wherein said seat member is arranged in said pressure relief passage with said first side exposed to high pressure;

a needle having an elongate shaft with a first end comprising a needle head and an opposite second end, said needle extending through said bore and having said needle head proximal said seat member, said needle head having an annular seat surface adapted to cooperate with said annular seat in said seat member to close said through bore in a closed position of said needle, said needle being reciprocally movable between said closed position and an open position where the needle head is spaced from said annular seat; and a spring element arranged to exert a closing force on said needle such that it is biased in said closed position, said spring element resting against a stop member rigidly linked with said needle.

2. The fuel pump according to claim 1, wherein said spring element is a compression spring surrounding said needle and bearing at one end on an annular surface of said first side of said seat member and at the other end on said stop member.

3. The fuel pump according to claim 1, wherein said stop member is arranged proximal to said second end of said needle.

4. The fuel pump according to claim 1, wherein said stop member is a disk like member having a central bore and is fixedly mounted to said needle.

5. The fuel pump according to claim 1, wherein said stop member is press-fittingly mounted onto needle and adjusted thereon to obtain a calibrated spring force.

6. The fuel pump according to claim 1, wherein said pressure relief valve assembly further comprises a guide sleeve fitted over said needle and surrounded by said spring element, said guide sleeve extending from said seat member along part of the length of said needle shaft towards said stop member.

7. The fuel pump according to claim 6, wherein said seat member comprises on the first side an enlarged bore section in axial continuation of said through bore in which said guide sleeve is partly received.

8. The fuel pump according to claim 6, wherein said guide sleeve has a front section proximal said seat member and a rear section proximal said stop member; and said guide sleeve includes at least one lateral aperture through said guide sleeve; and said guide sleeve and needle are configured such that in said rear section a sliding clearance is provided and a larger clearance is provided at said front section to allow a fluid flow path laterally through said guide sleeve aperture and towards said seat member.

9. The fuel pump according to claim 6, wherein said needle has a reduced cross-section between said head and a rear section sliding in said rear section of said guide sleeve.

10. The fuel pump according to claim 1, wherein said seat member is press-fittingly arranged in said pressure relief passage, in a fluid-tight manner.

11. The fuel pump according to claim 1, wherein said seat member is arranged in said pressure relief passage proximal to said pumping chamber, said second side being exposed to pumping chamber pressure.

12. The fuel pump according to claim 1, wherein said pressure relief passage includes a cylindrical main section in which said pressure relief valve assembly is arranged, the cylindrical main section being defined by a blind bore in said housing, said assembly being introduced through an inlet section of said blind bore, which is closed by a plug; and the seat member is arranged proximal to said plug whereas said stop member is proximal to a closed end of said blind bore.

13. The fuel pump according to claim 1, wherein said second side includes a raised, peripheral wall spaced from said annular seat by an annular groove.

14. The fuel pump according to claim 1, wherein said spring element and said stop member have a smaller outer diameter than said seat member.

15. The fuel pump according to claim 1, wherein said pressure relief valve assembly is formed as a pre-assembled unit, that is inserted into said pressure relief passage and entirely contained therein.

* * * * *